United States Patent
Goodman et al.

(10) Patent No.: US 6,937,411 B2
(45) Date of Patent: Aug. 30, 2005

(54) METHOD, SYSTEM, PROGRAM, AND STORAGE CARTRIDGE FOR STORING DATA IN A STORAGE MEDIUM

(75) Inventors: Brian Gerard Goodman, Tuscon, AZ (US); Glen Alan Jaquette, Tucson, AZ (US); Leonard George Jesionowski, Tucson, AZ (US); Judson Allen McDowell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/923,599

(22) Filed: Aug. 6, 2001

(65) Prior Publication Data

US 2003/0026021 A1 Feb. 6, 2003

(51) Int. Cl.⁷ ................................................ G11B 5/09
(52) U.S. Cl. ...................................... 360/48; 360/72.1
(58) Field of Search .......................... 360/48, 71, 72.1, 360/72.2, 72.3, 74.1, 78.02, 74.4; 386/83, 95, 125–126

(56) References Cited

U.S. PATENT DOCUMENTS

| | | | |
|---|---|---|---|
| 5,081,548 A | | 1/1992 | Inazawa et al. |
| 5,379,152 A | | 1/1995 | Odaka et al. |
| 5,388,012 A | | 2/1995 | Adams et al. |
| 5,388,016 A | | 2/1995 | Kanai et al. |
| 5,442,493 A | | 8/1995 | Shih et al. |
| 5,572,378 A | * | 11/1996 | Schwarz et al. ............... 360/48 |
| 5,613,082 A | | 3/1997 | Brewer et al. |
| 5,726,702 A | * | 3/1998 | Hamaguchi et al. .......... 725/55 |
| 5,757,571 A | | 5/1998 | Basham et al. |
| 5,761,007 A | * | 6/1998 | Price et al. .............. 360/264.4 |
| 5,814,171 A | | 9/1998 | Manes et al. |
| 5,828,507 A | | 10/1998 | Yamada et al. |
| 5,923,490 A | | 7/1999 | Joyce et al. |
| 5,969,893 A | * | 10/1999 | Basham et al. ................ 360/49 |
| 6,031,698 A | | 2/2000 | Bar |
| 6,052,247 A | * | 4/2000 | Treffers ........................ 360/48 |
| 6,628,469 B1 | * | 9/2003 | Hoyt ............................. 360/69 |
| 6,674,598 B2 | * | 1/2004 | Smith .......................... 360/69 |

FOREIGN PATENT DOCUMENTS

WO        9317422         9/1993

OTHER PUBLICATIONS

American National Standards Institute (Peterson, David A. (ed)). "Information Technology– SCSI–3 Stream Commands (SSC)". Revision 22 (Jan 2000). © 1999 by Information Industry Council (ITI). American National Standards Institute. pp. i–x, 1–90.

ECMA. "Data Interchange on 12,7 mm 384–Track Magnetic Tape Cartridges–Ultrium–1 Format". Final Draft, Mar. 2001. pp. i–vii, 1–145.

IBM Corp. "StorageSmart by IBM Ultrium Tape Drive: SCSI Reference". First Edition (Aug. 2000), © Copyright IBM Corporation 2000. pp. i–viii, 1–88.

Sandstå Olav and Roger Midstraum. "Improving the Access Time Performance of Serpentine Tape Drives". Paper Presented at 15th International Conference on Data Engineering, Sydney, Australia, Mar. 23–26, 1999.

* cited by examiner

*Primary Examiner*—David Hudspeth
*Assistant Examiner*—Jason Olson
(74) *Attorney, Agent, or Firm*—David W. Victor; Konrad Raynes & Victor LLP

(57) ABSTRACT

Provided is a method, system, and program for storing data in a storage medium. A layout of a storage medium including a first and second user data sections is provided, wherein the first user data section comprises a faster access storage space than the second user data section. A determination is made of a first set of data to be accessed with less delay than a second set of data. The first set of data is written to the first user data section and the second set of data is written to the second user data section.

57 Claims, 7 Drawing Sheets

FIG.6

| Wrap Section | Begins | Ends | Direction |
|---|---|---|---|
| 0 | LP3 | LP4 | Forward |
| 1 | LP4 | LP3 | Backward |
| 2 | LP3 | LP4 | Forward |
| 3 | LP4 | LP3 | Backward |
| .... | .... | ..... | ..... |
| 46 | LP3 | LP4 | Forward |
| 47 | LP4 | LP3 | Backward |
| 48 | LP3' | LP4' | Forward |
| 49 | LP4' | LP3' | Backward |
| 50 | LP3' | LP4' | Forward |
| 51 | LP4' | LP3' | Backward |
| 52 | LP3' | LP4' | Forward |
| ... | .... | .... | .... |
| 94 | LP3' | LP4' | Forward |
| 95 | LP4' | LP3' | Backward |

FIG.7

| Wrap Section | Begins | Ends | Direction |
|---|---|---|---|
| 0 | LP3 | LP4 | Forward |
| 1 | LP4 | LP3 | Backward |
| 2 | LP3 | LP4 | Forward |
| 3 | LP4 | LP3 | Backward |
| .... | .... | ..... | ..... |
| 46 | LP3 | LP4 | Forward |
| 47 | LP3' | LP4' | Forward |
| 48 | LP4' | LP3' | Backward |
| 49 | LP3' | LP4' | Forward |
| 50 | LP4' | LP3' | Backward |
| 51 | LP3' | LP4' | Forward |
| 52 | LP4' | LP3' | Backward |
| ... | .... | .... | .... |
| 94 | LP4' | LP3' | Backward |
| 95 | LP4 | LP3 | Backward |

METHOD, SYSTEM, PROGRAM, AND STORAGE CARTRIDGE FOR STORING DATA IN A STORAGE MEDIUM

BACKGROUND OF THE INVENTION

1. Field of the Invention

The present invention relates to a method, system, program, and storage cartridge for storing data in a storage medium.

2. Description of the Related Art

Three prevalent tape storage technologies include a helical scan tape where data is stored along vertical or diagonal tracks on the tape, parallel tape where data is stored on tracks in parallel during one scan on the tape, and serpentine tape where data is written in a forward and then reverse direction in a serpentine pattern across bands or tracks on the magnetic tape medium. In serpentine tape drives, the bands extending the length of the tape may be divided into sections, such as a housekeeping section, calibration section, user data section, etc., where data is written in a serpentine manner within the longitudinal bands of a section. A serpentine tape drive first read/writes a track in a forward direction within a section of a band, referred to as a wrap, then read/writes the next track in a reverse direction, and so on, leading to a serpentine pattern for the data layout. In tape technology, a wrap comprises one of the bands that extend the entire length of the tape and a wrap section comprises a section of the wrap.

FIG. 1 illustrates a layout of a tape format in conformance with the Linear Tape Open (LTO) Ultrium format, which is a serpentine tape format technology. The length of the tape is divided into logical points (LPs), which define bounds of regions of the tape. The regions of LP0 to LP1 and LP6 and LP7 are unused as they are at the beginning and end of the tape, the region of LP1 to LP2 is a servo acquisition area, LP2 to LP3 is a calibration area that includes different information in the different bands, LP3 to LP4 is the user data, LP4 to LP5 is an unused user data area and LP5 to LP6 is a servo acquisition region for reverse wraps. The user data section further includes a format identification data set (FID), including information regarding the format of the tape and the tape drive that wrote the FID. In the LTO format, data is written in a serpentine fashion between the logical points each of the data sections between LP3 and LP4.

The access time for a tape drive comprises the time from when the host attachment's input/output (I/O) request is submitted to when the operation is complete. For a Space or Locate command the data should then be in buffer, for a Read command the data has been transferred back to the host. The overall access includes two components: the lateral access and the longitudinal access. Longitudinally every wrap (from LP3 to LP4) may be divided into multiple pieces. In LTO each wrap is divided into two pieces (at the mid-point), each of which is called a wrap section. Laterally data is divided into bands (e.g. the LTO format has 4 data bands), and at any given location there are generally as many wrap sections which can be accessed via lateral movement alone as there are wraps (e.g. there are only 48 wrap sections available via lateral access at any given longitudinal position in LTO, one corresponding to each of the 48 wrap positions, even though there are a total of 96 wrap sections because each of the wraps is longitudinally divided into two wrap sections). Lateral access involves moving the head laterally to the proper wrap, and is limited to approximately 9 mm in the worst case in LTO. Longitudinal access involves moving the tape until the target is either under the head or in buffer. In LTO, if the head begins in the same tape half as the target the maximum required longitudinal access is 290 meters (e.g. BOT to (LP3+LP4)/2), but if the head begins in the opposite tape half it could be as much as 580 m (e.g. BOT to LP4).

To determine the longitudinal position, the tape drive uses the Tape Directory which is stored either on tape or in some auxiliary cartridge memory (e.g. LTO's CM). The tape directory will typically include information at different longitudinal positions on tape which can be used at a minimum to bound the target (e.g. if we know there is one Filemark in a full wrap section all that is known is that the Filemark is between two points such as between LP3 and (LP3+LP4)/2 if it is in the first wrap section). The information to bound the target can also be used in linear interpolation to estimate the target's position (e.g. if we know there are 1 million 1 Kbyte records in a wrap section, then interpolation would suggest that the 400,000th record is approximately 40% of the way between the beginning and end of that wrap section).

One drawback to the relatively inexpensive tape storage is the time required to access data. In fact, the time to wind the tape to the correct longitudinal position can take a minute or more. Thus, the tape access time is primarily determined by the time needed to longitudinally wind the tape to the correct position.

Data may be accessed randomly from the tape. When randomly accessing data, the tape drive may have to wind the tape to entirely different longitudinal positions within the user data area, e.g., the area between LP3 to LP4. The longer the user data area or tape length, the more time required to wind or position the tape medium under the tape head.

Thus, there is a need in the art to provide improved techniques for optimizing access time when randomly accessing data on a tape storage medium.

SUMMARY OF THE PREFERRED EMBODIMENTS

Provided is a method, system, and program for storing data in a storage medium. A layout of a storage medium including a first and second user data sections is provided, wherein the first user data section comprises a faster access storage space than the second user data section. A determination is made of a first set of data to be accessed at a faster rate than a second set of data. The first set of data is written to the first user data section and the second set of data is written to the second user data section.

In further implementations, the storage medium comprises a magnetic tape medium and the first user data section has a shorter longitudinal length than the second user data section. Still further, the data may be written in separate serpentine patterns within the first and second user data sections.

Further provided is a method for storing data records on a magnetic tape medium. a first set of data records is selected to write to a first user data section of the magnetic tape medium. The magnetic tape medium further includes a second user data section, wherein the first user data section comprises a faster access user data section than the second user data section. The first set of data records are transferred to write to the magnetic tape medium wherein the first set of data records are written to the first user data section. The second set of user data records are transferred to write to the magnetic tape medium after writing the first set of data records. The second set of data records are written to one of the first user data section or second user data section of the magnetic tape medium.

Still further provided is a magnetic tape medium, wherein the magnetic tape medium comprises a first user data section and a second user data section. The first user data section comprises a faster access storage space than the second user data section. A first set of data to be written with less access delay than a second set of data is written to the first user data section and the second set of data is written to the second user data section.

The described implementations provide a technique to implement a fast access data section within a storage medium, such as a magnetic tape medium, to allow faster random access to data in the fast access data section over data stored in one or more additional user data sections on the storage medium.

BRIEF DESCRIPTION OF THE DRAWINGS

Referring now to the drawings in which like reference numbers represent corresponding parts throughout:

FIGS. 6 and 7 explain serpentine patterns for writing data to wrap sections in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
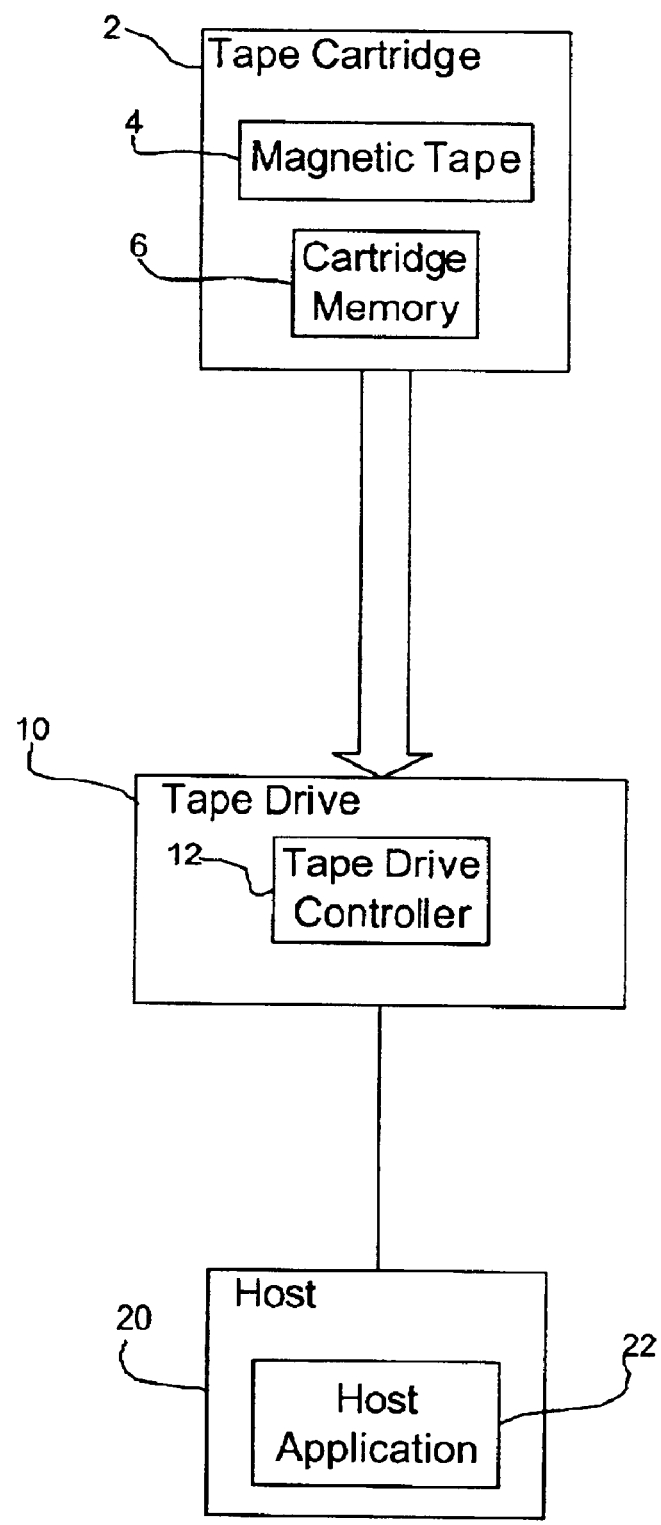
FIG. 2 illustrates tape storage system in which aspects of the invention are implemented.

FIG. 2 illustrates an architecture of a tape storage system in which aspects of the invention are implemented. A tape cartridge 2 includes a high capacity single reel of magnetic tape 4 and a non-volatile read/writable cartridge memory 6 which maintains information about the format and layout of data on the magnetic tape. In further implementations, the tape cartridge 2 may comprise a dual wheel tape cartridge. In certain implementations, the tape cartridge 2, includes aspects of the Linear Tape Open (LTO) Ultrium format. Details of the Ultrium format are described in the publication "Data Interchange on 12,7 mm 384-Track Magnetic Tape Cartridges—Ultrium-1 Format", Draft Standard published by the ECMA (March 2001), which publication is incorporated herein by reference in its entirety.

The tape cartridge 2 may be inserted in a tape drive 10, that includes read/write heads (not shown) capable of transferring data to and from the magnetic tape 4 in a manner known in the art. The tape drive 10 further includes one or more tape drive controllers 12 that receive Input/Output (I/O) requests from a host system 20 and is capable of executing the received I/O requests by rewinding the tape and positioning the tape heads at a particular location on the magnetic tape 4 using tape drive mechanisms and algorithms to estimate the likely location of a file on the magnet tape 4 in a manner known in the art. The tape drive 10 may be enclosed within the host system 20 or as a standalone unit or in a tape library (not shown). The tape drive 10 may connect with the host 20 through a direct interface, e.g., SCSI, Fibre Channel, etc., such as the case if the tape drive 10 is connected to the host 20 or connect over a network, such as a Local Area Network (LAN), Storage Area Network (SAN), Wide Area Network (WAN), the Internet, an Intranet, etc.

The host 20 includes a host application 22, which may comprise a backup program, that transfers data to the tape drive 10 to sequentially write to the magnetic tape 4. The host application 22 may utilize the Small Computer System Interface (SCSI) tape commands to communicate I/O requests to the tape drive 10. Details of the SCSI commands used to communicate I/O requests between the tape drive 10 and host application 22 are described in the publications "StorageSmart by IBM: Ultrium Tape Drive: SCSI Reference", published by International Business Machines Corporation ("IBM") as document no. WB1110-00 (August, 2000) and "SCSI-3 Stream Commands (SSC)", published by the American Standards Institute as Working Draft, Revision 22 (Jan. 1, 2000), which publications are both incorporated herein by reference in their entirety.

In accordance with SCSI tape commands, the host application 22 would write data records sequentially to the tape drive 20. To retrieve data records, the host application 22 would read data sequentially from the magnetic tape 20. To access data randomly from the magnetic tape 4, the host application 22 could send the SCSI SPACE and LOCATE commands to the tape drive 10 to request a data record at an offset from the last record read from the magnetic tape 4. The host application 22 would use the SPACE command to instruct the tape drive 10 to set a new logical position relative to the current logical position, which is determined from the last data record returned by the tape drive 10. The SPACE command specifies a count field indicating the number of blocks (or filemarks) to move forward (if positive) or backward (if negative). The host application 22 would use the LOCATE command to instruct the tape drive 10 to position the magnetic tape 4 to the specified logical element at the specified position.

Figure 3:
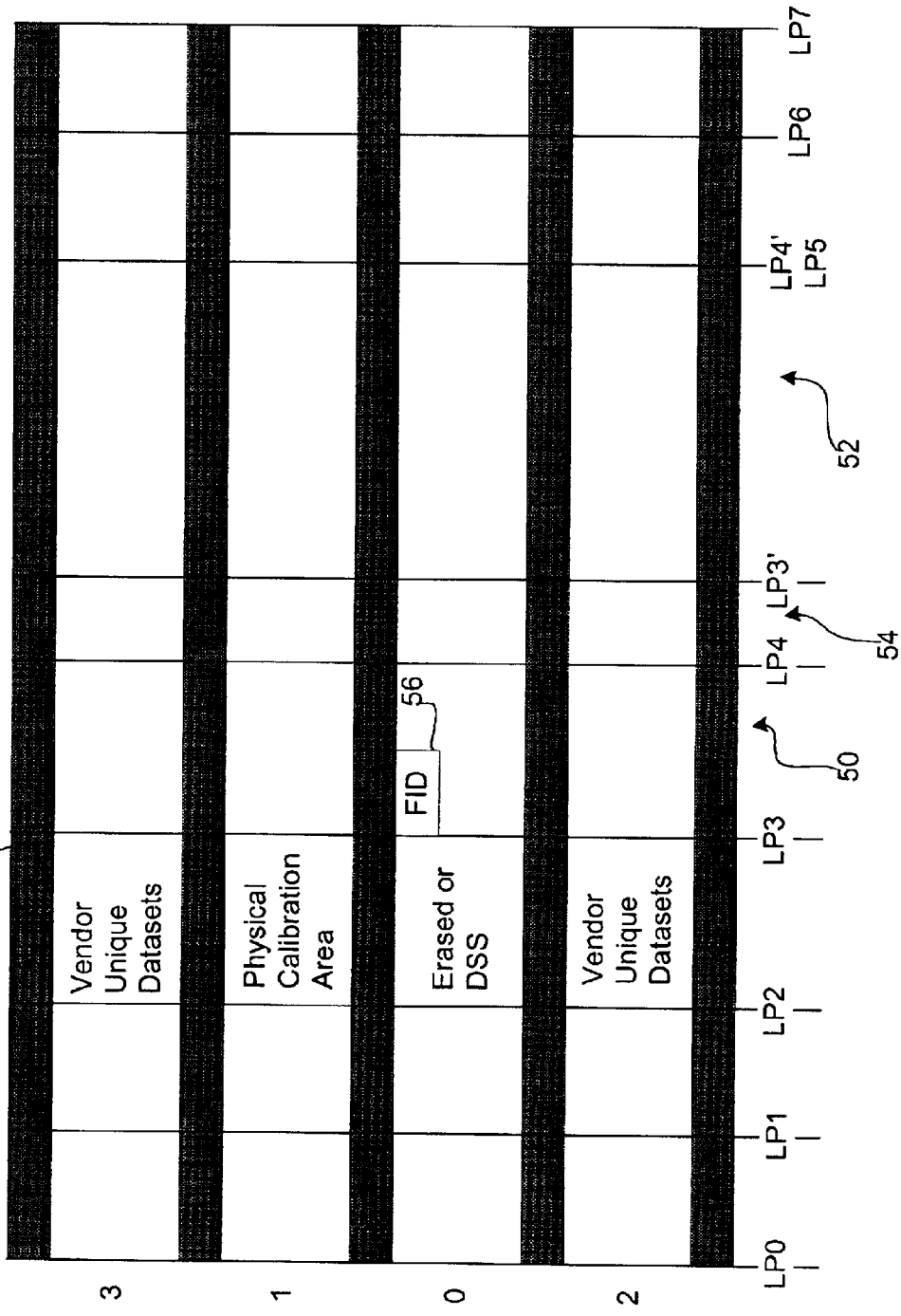
FIG. 3 illustrates the layout of a magnetic tape medium in accordance with implementations of the invention.

FIG. 3 illustrates a layout format of the logical points on the magnetic tape 4 in accordance with one implementation of the invention. The layout of FIG. 3 includes sections found in the prior art LTO tape format, such as the housekeeping sections from LP1 to LP2, and the beginning (LP0 to LP1) and end (LP6 to LP7) sections. The layout of FIG. 3 further includes two separate user data sections 50 and 52, extending from LP3 to LP4 and LP3' to LP4', respectively. Data section 50 has a length that is less than the length of data section 52. Because data section 50 has a shorter longitudinal length, less time is needed to seek to a location in data section 50 during a random access operation than the time required to seek to a location in the longer data section 52. Thus, data section 50 comprises a faster data access section where the host application 22 can place data accessed more frequently, such as control and configuration data, application data, directory information, and other more frequently accessed data. Further, because the first user data section 50 is located before the second user data section 52 on the tape, data in the first user data section 50 may be accessed faster than data in the second user data section 52 when seeking from the beginning of the tape.

Figure 1:
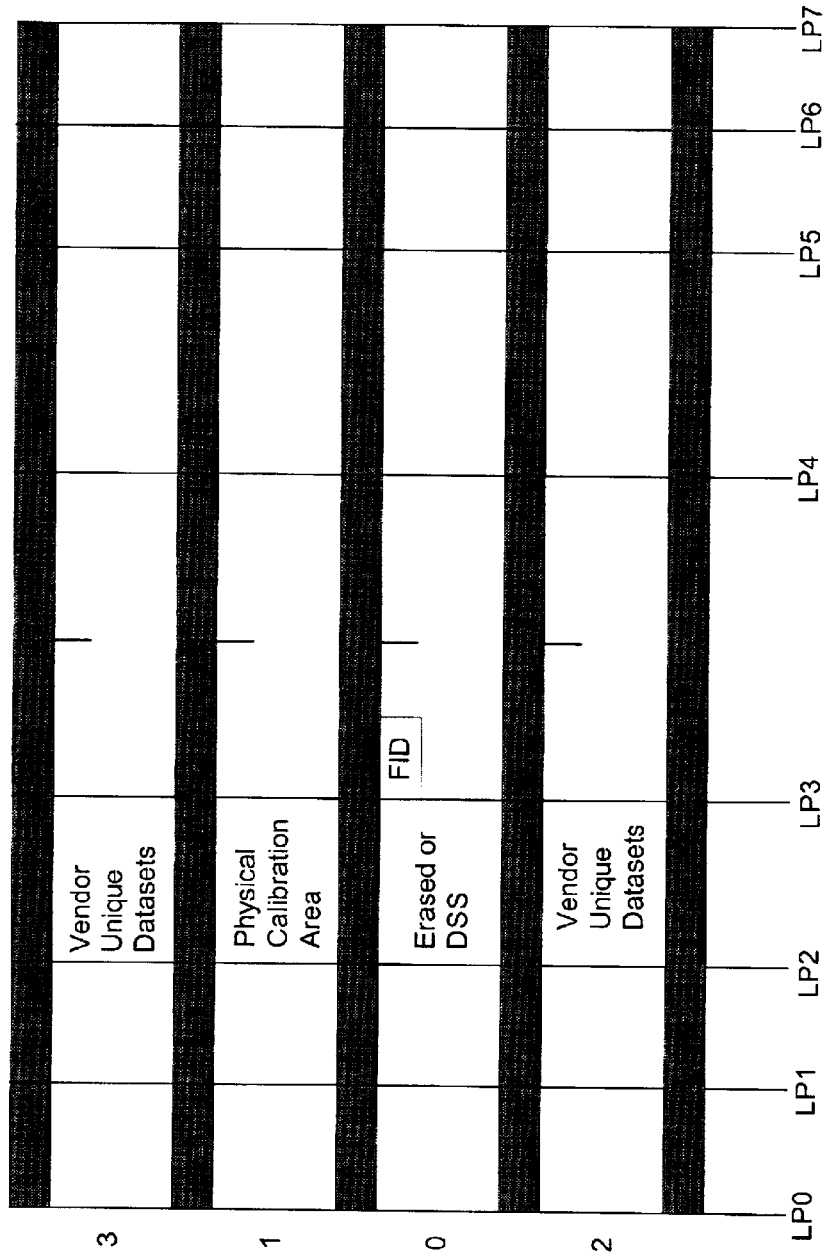
FIG. 1 illustrates the layout of a magnetic tape medium in a manner known in the prior art.

In the prior art LTO tape format, shown in FIG. 1, each wrap extending between LP3 and LP4 in FIG. 1 would include two wrap sections of equal length. In the prior art layout of FIG. 1, the user data section between LP3 and LP4 has four bands, where each band includes six forward wraps extending from LP3 to LP4 and another six backward wraps extending from LP4 to LP3. Because each wrap includes two wrap sections, there are a total of 96 wrap sections in the user data section between LP3 and LP4 in the prior art tape layout arrangement.

In one implementation, each of the data sections 50 and 52 include separate serpentine wraps, where each of the four bands has six forward wraps and six backward wraps. In the described implementations, each of the 48 wraps in the data sections 50 and 52 would comprise wrap sections. In this way, 96 wrap sections are equally divided between the two user data sections 50 and 52, where there is one wrap section for each wrap.

Figure 4:
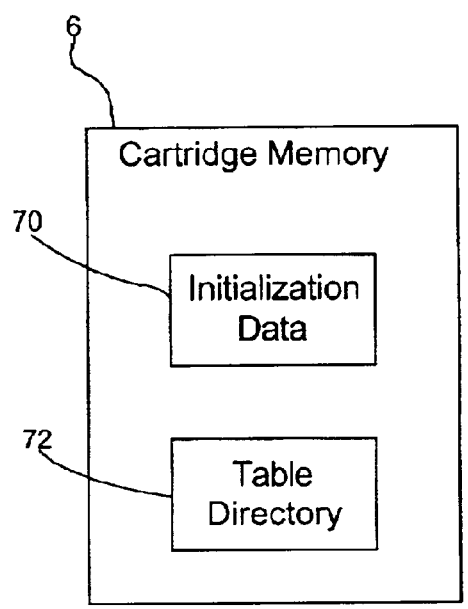
FIG. 4 illustrates a tape cartridge memory used in accordance with implementations of the invention.

FIG. 4 illustrates further details of the data structures in the cartridge memory 6, including initialization data indicating the longitudinal position of all the logical points, including LP1, LP2, LP3, LP4, LP3', LP4', LP5, LP6, and LP7. The tape drive controller 12 would use the initialization data 70 to determine the start and end of each of the user data sections 50 and 52. The cartridge memory 6 further includes a table directory 72 that includes entries for each of the wrap sections. As discussed, in implementations where there are two separate user data sections 50 and 52, the 96 possible wrap sections would be divided between these two user data sections. Thus, each wrap in the user data sections 50 and 52 would comprise a wrap section. For each of the wrap sections listed in the table directory 72, the wrap section entry may specify:

Data Set ID: specifies the Data Set Identity of the last Data Set written in this wrap section. If this wrap section does not contain valid Data Sets, then this field shall be set to (0xFFFFFFFF).

Record Count: If this Wrap Section is valid, this field shall contain the number of Records that are started in the current Wrap Section. If the Data Set ID of this Wrap Section is (0xFFFFFFFF) and hence this Wrap Section is invalid, the Record Count field is not defined for interchange.

File Mark Count: If this Wrap Section is valid, this field shall contain the number of File Marks that are within the current Wrap Section. If the Data Set ID of this Wrap Section is (0xFFFFFFFF) and hence this Wrap Section is invalid, the File Mark Count field is not defined for interchange.

CRC: This field shall specify the CRC generated for the wrap section data in the table directory 72.

Additional or different fields may be maintained for wrap sections in the table directory 72 to those described above.

The wrap sections would map to the lateral bands extending through the user data sections 50 and 52 in a predefined manner, such that the wrap sections comprise the forward and backward wraps within the data sections 50 and 52. The tape drive controller 12 would utilize the wrap section information in the table directory 72 to estimate the longitudinal position within the wrap section of a requested data record.

In one implementation, the prior art LTO tape layout format of FIG. 1 may be modified to format the tape layout format of the described implementations of FIG. 3. For such implementations, to define the second user data section 52, LP3' may be set to a fixed value, such as 0.50 meters beyond LP4 so long as LP3' is less than LP5. The LP5 point in the prior art LTO Ultrium format (FIG. 1) then becomes LP4', and LP3 to LP5 can be 580 meters on a Type A LTO cartridge. Thus, if LP4 is set to LP3 plus 79.5 meters, then LP3 plus 79.5 meters plus 0.5 meters equals LP3 plus 80 meters. This provides two user data sections, one of 79.5 meters and the other of 500 meters, with a 0.5 meter section 54 (FIG. 3) separating the two user data sections 50 and 52. A third user data section would require that the length of LP4' is less than LP5 to allow the definition of LP3" and LP4" for the third user data section between LP3 and LP5.

In implementations where the magnetic tape 4 layout comprises a modification of the LTO Ultrium tape layout shown in FIG. 1, the pages in the cartridge memory 6 and the FID 56 (FIG. 3) may include code or data that would prevent tape drives that only support the standard LTO cartridge format from accessing the cartridge, so that only tape drives 10 that include logic capable of writing to the different user data sections 50 and 52 would access the magnetic tape medium 4.

Figure 5:
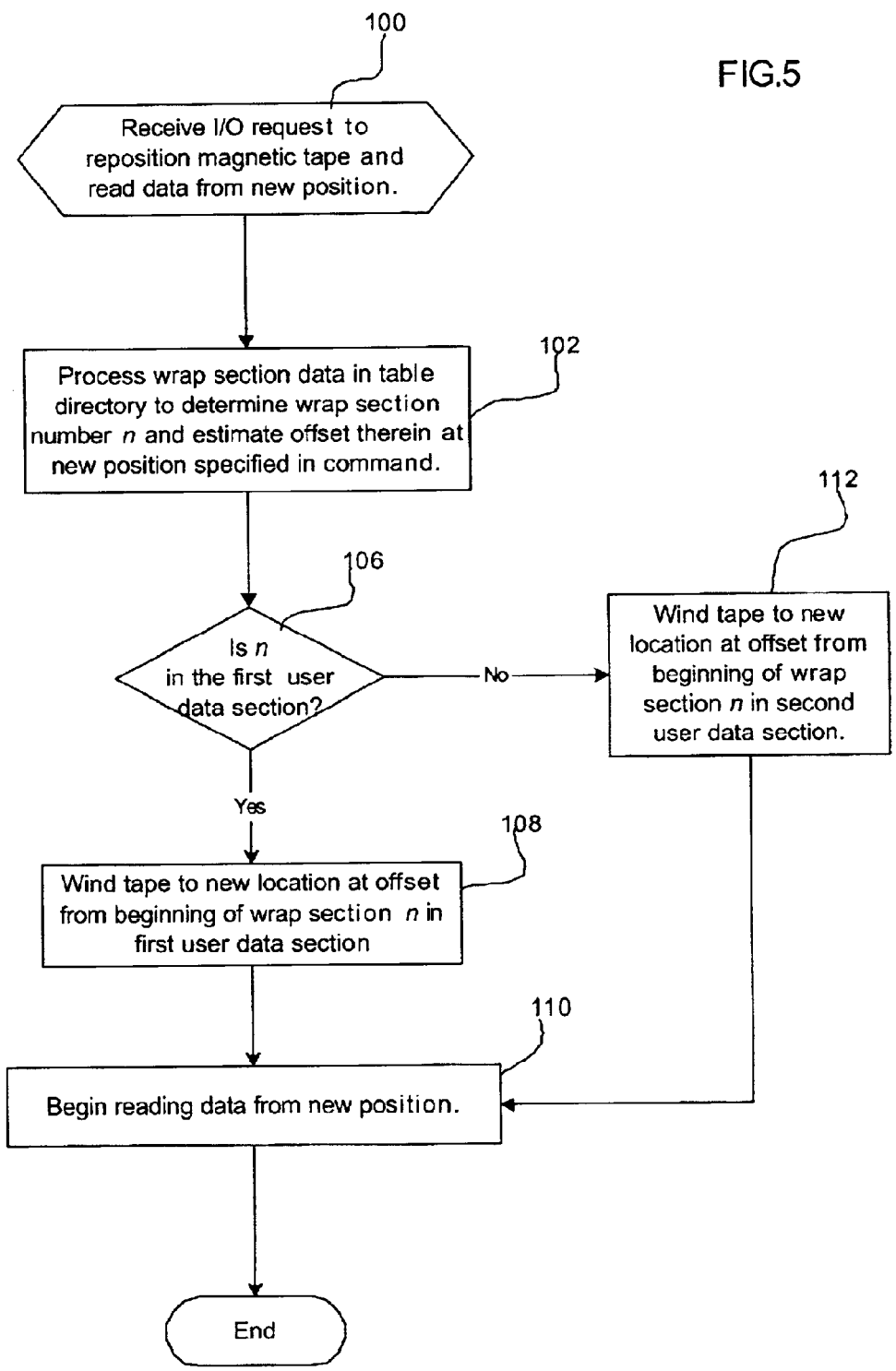
FIG. 5 illustrates logic implemented in a tape drive to access data on a magnetic storage medium in accordance with implementations of the invention.

FIG. 5 illustrates logic implemented in the tape drive controller 12 to access the user data sections 50 and 52. Control begins at block 100 with the tape drive controller 12 receiving I/O commands from the host 20 to reposition the magnetic tape 4 to a new position and read or write data records from that new position. The host application 22 may use the SCSI LOCATE or SPACE command to instruct the tape drive 10 to move the magnetic tape 4 to a new position. The tape drive controller 12 then processes (at block 102) the table directory 72 to determine the wrap section number n and to estimate the offset therein of the requested data set in a manner known in the art.

If (at block 106) the determined wrap section n is in data section 50, where there are wrap sections numbered 0 to 95, then the requested data set is located in the first user data section 50. In such case, the tape drive controller 12 winds (at block 108) the magnetic tape 4 the determined longitudinal offset within wrap n of the user data section 50. As discussed, when the user data sections is divided into two sections 50 and 52, the wrap section n number corresponds directly to a forward or backward wrap number within one of the bands. The tape drive controller 12 then accesses (at block 110) the requested data set from the tape after winding to position the requested data set under the read/write head of the tape drive 10 and executes the I/O request at the accessed data set. If (at block 106) the wrap section number n in the second user data section 52, then the tape drive controller 12 winds (at block 112) the magnetic tape 4 to the determined longitudinal offset of wrap n within the second user data section 52.

In the described implementations, data is written in a serpentine pattern through the user data sections 50 and 52. FIG. 6 provides a table explaining how data is written in a serpentine pattern in wrap sections through user data sections 50 and 52 in one implementation. In the serpentine pattern of FIG. 6, the first 48 wrap sections, 0–47, alternate writing forward and backward between LP3 and LP4, ending on LP3 in the 48$^{th}$ wrap section (wrap section 47). The next 48 wrap sections are then written in the same serpentine pattern between LP3' and LP4', alternating between forward and backward, and ending on LP3'. With the serpentine pattern implementation of FIG. 6, the tape drive must seek from LP3 to LP3', which as described above may be 80 meters apart, at the end of the first user data section 50 to the beginning of the second user data section 52.

FIG. 7 illustrates an additional serpentine pattern implementation that minimizes the distance to seek when writing data to the 49$^{th}$ wrap section (wrap section 48). In the serpentine pattern of FIG. 7, the tape drive writes in a serpentine pattern, alternating in the forward and backward direction between LP3 and LP4 for the first 47 wrap sections, e.g., wrap sections 0 through 46, which is the same pattern in FIG. 6 for the first 47 wrap sections. However, the pattern of FIG. 7 differs from FIG. 6 in that upon reaching the end of the 47$^{th}$ wrap section (the end of wrap section 46), the tape drive moves from LP4 to LP3' and then starts writing in a serpentine pattern, alternating between the forward and backward direction between LP3' and LP4' in the second user data section 52. This alternating pattern continues from wrap sections 47 through 94. There is a last possible wrap section 95, which can be written in the backward direction in the first user data section 52 from LP4 to LP3. This last wrap section 95 may not be usable in certain implementations where shingled writing is used and where the first data section to be written second. Thus in certain implementations, the last possible wrap section 95 may not be used.

The serpentine pattern of FIG. 7 improves the write performance when writing to wrap sections between the first 50 and second 52 user data sections by avoiding the need to seek from LP3 to LP3' when starting to write wrap section 47 at the beginning of the second user data section 52. Instead, with the serpentine pattern of FIG. 7, the tape drive needs only seek 0.5 meters when moving from the end of the first user data section 50 to the beginning of the second user data section 52. This is a performance improvement over the serpentine pattern of FIG. 6, which requires that the tape drive seek 80 meters when moving from the end of the first user data section 50 to the beginning of the second user data section 52.

Because the second user data section 52 is at a length of tape that is beyond the first user data section 50, the seek time from the beginning of the tape takes longer. Because the user data section 50 is shorter than is the user data section 52, the average seek time from one point in user data section 50 to another in user data section 50 is shorter than from one point in user data section 52 to another point in user data section 52. Thus, from the beginning of the tape or for movements within a wrap section, the first user data section 50 is faster than the second section 52 because the second section 52 follows the first section 50, and the first section is shorter. Accordingly, data that is more frequently accessed could be placed in the faster access first user data section 50.

In certain implementations, the host application 22 may include logic to organize data records for storage to the magnetic tape 20 to place data likely to be accessed more frequently in the first user data section 50 and data likely to be accessed less frequently following the more frequently accessed data. When sequentially writing the data to the magnetic tape 4, the host application 22 would first write the data records sequentially to the wraps in the first user data section 50 and then write the data records to the wraps in the second user data section 52. In this way, the host application 22 may organize how data is stored in the user data sections 50 and 52.

The described implementations may be used to provide optimal storage of large multimedia files to provide users fast access. In one implementation, the first user data section 50 may store a low resolution clip or preview of a large multimedia file, e.g., video file, and the second user data section 52 may store a higher resolution or quality version of the file. In this way, a user would have faster access to the low resolution preview of the file, and if the user is interested can then access the full multimedia file from the slower access second user data section 52. This improves performance when scanning preview files on tape to determine multimedia files of interest.

ADDITIONAL IMPLEMENTATION DETAILS

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the data is first written to the first user section and after that section fills, to the second user data section. In alternative implementations, data may be written to the second user data section before the first is completely filled. This may be accomplished by predefining a number of blocks, N, in the first section (e.g. 100000 records) and handle it such that a Space or Locate to the N+1 (100001th) Record, or to End of Data (EOD) will position one to the start of the second user data section, from which one can begin writing. Similarly a Space or Locate to block 0, or a Rewind, will position to the start of the first section. In this way, the first user data section could be updated after the second user data sections. Further, the whole serpentine may be processed in the backwards direction in order to start with the end of the second section and work backwards. In such implementations, the first and second user data sections are part of a same logical partition that is still multi-segmented, not multi-partitioned.

In the described implementations, there were 96 wrap sections equally divided between two different user data sections 50 and 52, where the tape drive controller 12 first writes data in a serpentine pattern to the forward and backward wraps in the first user data section 50 and then, after filling the first user data section 50, writes data in a serpentine pattern to the forward and backward wraps in the second user data section 52. In additional implementations, there may be more than two user data sections, where the initialization data 70 would provide additional logical points for additional user data sections. In such cases, the 96 wrap sections may be divided among the three or more user data sections. Still further, the tape directory and other page information in the cartridge memory may define additional or fewer wrap sections than the 96 described herein as dispersed among the multiple user data sections.

In the described implementations, data was organized into wrap sections in the user data sections. In alternative implementations, the data in the user data sections may be organized into physically consecutive groups of tracks other than wrap sections.

In the described implementations, the host application 22 communicated with the tape drive 10 using SCSI commands. In alternative implementations, different data transfer protocols other than SCSI may be used.

FIGS. 6 and 7 illustrate serpentine patterns that may be followed when writing data to wrap sections in the first 50 and second 52 user data sections. However, those skilled in the art will appreciate that different serpentine patterns may be used when writing data to the wrap sections in the user data sections 50 and 52.

In the described implementations, the directory information is stored in cartridge memory. In alternative tape implementations, such as tape cartridges that do not include a cartridge memory device, the directory information may be stored on tape or on a host system.

The described implementations provide a technique for transferring data to a tape drive. Additionally, the above described logic may be used with other input/output (I/O) devices or other storage devices, e.g., optical tape.

The described implementations utilized serpentine Linear Tape Open (LTO) technology. In alternative implementations, alternative tape technologies may be used, such as helical-scan tape drive that read/write vertical or diagonal tracks on the tape using a rotating read/write head and parallel tape drives that read/write tracks in parallel during one scan through the tape. The described implementations may be utilized with Digital Linear Tape (DLT), Quarter Inch Cassette (QIC), Travan, and any other tape technology known in the art.

The logic implementation of FIG. 5 described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for storing data in a storage medium, comprising:
providing a layout of a magnetic tape storage medium including a first and second user data sections, wherein the first user data section has a shorter longitudinal length than the second user data section so that the first user data section comprises a faster access storage space than the second user data section;
determining a first set of data to be accessed with less delay than a second set of data;
writing the first set of data to the first user data section in a serpentine pattern; and
writing the second set of data to the second user data section in a serpentine pattern separate from the serpentine pattern of the first user data section.

2. The method of claim 1, wherein data is written to the second user data section after the first user data section is filled with data.

3. The method of claim 1, wherein the first and second user data sections are comprised of separate wrap sections on the tape.

4. The method of claim 1, wherein the magnetic tape medium is implemented using Linear Tape Open (LTO) technology.

5. The method of claim 1, wherein data is written in a serpentine pattern in n wrap sections between a beginning point and end point of the first user data section and in n wrap sections between a beginning point and end point of the second user data section, whereby there are a total of 2*n wrap sections in the first and second user data sections.

6. The method of claim 5, wherein writing the data to wrap sections between the beginning and end points of the first and second user data sections further comprises:
writing in the serpentine pattern data to a first through (n−1) wrap sections between the beginning and end points in the first user data section; and
writing in the serpentine pattern data to an n through (2*n−1) wrap sections between the beginning and end points in the second user data section.

7. The method of claim 6, further comprising:
writing data to wrap section 2*n from the end to the beginning points of the first user data section.

8. The method of claim 5, wherein writing the data to wrap sections between the beginning and end points of the first and second user data sections further comprises:
writing in the serpentine pattern data to a first through n wrap sections between the beginning and end points in the first user data section; and
writing in the serpentine pattern data to an (n+1) through (2*n) wrap sections between the beginning and end points in the second user data section.

9. The method of claim 1, wherein the first user data section is located closer to a beginning of the tape medium than the second user data section.

10. The method of claim 9, wherein data in a non-volatile memory in a cartridge including the magnetic tape medium indicates beginning and end longitudinal positions on the tape medium of the first and second user data sections.

11. The method of claim 1, wherein data within each user data section is stored in a consecutive wrap section, which comprises a section of the wrap extending the length of the tapes track groups, further comprising:
receiving a request to access a new position on the storage medium;
determining one wrap section in one of the first or second user data sections including the requested new position; and
accessing the requested new position in the determined wrap section in one of the first or second user data sections.

12. The method of claim 1, wherein there are additional user data sections in the storage medium.

13. A method for storing data files on a magnetic tape medium, comprising:
selecting a first set of data files to write to a first user data section of the magnetic tape medium, wherein the magnetic tape medium further includes a second user data section, and wherein the first user data section has a shorter longitudinal length than the second user data section so that the first user data section comprises a faster access user data section than the second user data section;

transferring the first set of data files to write to the magnetic tape medium wherein the first set of data files are written to the first user data section; and transferring the second set of user data files to write to the magnetic tape medium after writing the first set of data files, wherein the second set of data files are written to the second user data section of the magnetic tape medium.

14. The method of claim 13, wherein before writing the second set of data files to the magnetic tape medium, filling the first user data section with data.

15. The method of claim 13, wherein data is written in separate serpentine patterns within the first and second user data sections.

16. The method of claim 15, wherein the first user data section is located closer to a beginning of the tape medium than the second user data section.

17. A method for storing data files on a magnetic tape medium, comprising:

selecting a first set of data files to write to a first user data section of the magnetic tape medium, wherein the magnetic tape medium further includes a second user data section, and wherein the first user data section comprises a faster access user data section than the second user data section;

transferring the first set of data files to write to the magnetic tape medium wherein the first set of data files are written to the first user data section; and transferring the second set of user data files to write to the magnetic tape medium after writing the first set of data files, wherein the second set of data files are written to the second user data section of the magnetic tape medium wherein the first set of data files comprises previews of a multimedia files and wherein the second set of data files comprises the full multimedia files for which previews are included in the first set of data files.

18. A tape cartridge including a magnetic tape medium, wherein the magnetic tape medium comprises:

a first user data section; and a second user data section, wherein the first user data section has a shorter longitudinal length than the second user data section so that the first user data section comprises a faster access storage space than the second user data section, wherein a first set of data to be accessible with less access delay than a second set of data is written to the first user data section in a serpentine pattern and wherein the second set of data is written to the second user data section in a serpentine pattern separate from the serpentine pattern of the first user data section.

19. The tape cartridge of claim 18, wherein the first user data section is located closer to a beginning of the tape medium than the second user data section.

20. The tape cartridge of claim 18, wherein the magnetic tape medium is implemented using Linear Tape Open (LTO) technology.

21. The tape cartridge of claim 18, wherein there are additional user data sections in the storage medium.

22. A system for storing data, comprising:

a storage medium;

means for providing a layout of the storage medium including a first and second user data sections, wherein the first user data section comprises a faster access storage space than the second user data section;

means for determining a first set of data to be accessed with less access delay than a second set of data; and means for writing the first set of data to the first user data section and for writing the second set of data to the second user data section.

23. The system of claim 22, wherein the means for writing writes data to the second user data section after the first user data section is filled with data.

24. The system of claim 22, wherein the storage medium comprises magnetic tape, and wherein the first and second user data sections are comprised of separate wrap sections on the tape.

25. The system of claim 22, wherein the storage medium comprises a magnetic tape medium, and wherein the first user data section has a shorter longitudinal length than the second user data section.

26. The system of claim 22, wherein the magnetic tape medium is implemented using Linear Tape Open (LTO) technology.

27. The system of claim 22, wherein the storage medium comprises magnetic tape and wherein data is written in separate serpentine patterns within the first and second user data sections.

28. The system of claim 27, wherein the means for writing the first and second sets of data further performs:

writing data in a serpentine pattern in n wrap sections between a beginning point and end point of the first user data section and in n wrap sections between a beginning point and end point of the second user data section, whereby there are a total of 2*n wrap sections in the first and second user data sections.

29. The system of claim 28, wherein the means for writing the first and second sets of data further performs:

writing in the serpentine pattern data to a first through (n−1) wrap sections between the beginning and end points in the first user data section; and writing in the serpentine pattern data to an n through (2*n−1) wrap sections between the beginning and end points in the second user data section.

30. The system of claim 29, wherein the means for writing the first and second sets of data further performs:

writing data to wrap section 2*n from the end to the beginning points of the first user data section.

31. The system of claim 28, wherein the means for writing the first and second sets of data further performs:

writing in the serpentine pattern data to a first through n wrap sections between the beginning and end points in the first user data section; and writing in the serpentine pattern data to an (n+1) through (2*n) wrap sections between the beginning and end points in the second user data section.

32. The system of claim 22, wherein the first user data section is located closer to a beginning of the tape medium than the second user data section.

33. The system of claim 22, wherein data in a non-volatile memory in a cartridge including the magnetic tape medium indicates beginning and end longitudinal positions on the tape medium of the first and second user data sections.

34. The system of claim 22, wherein the storage medium comprises a magnetic tape, wherein data within each user data section is stored in a consecutive wrap section, which comprises a section of the wrap extending the length of the tapes track groups, further comprising:

means for receiving a request to access a new position on the storage medium;

means for determining one wrap section in one of the first or second user data sections including the requested new position; and means for accessing the requested new position in the determined wrap section in one of the first or second user data sections.

35. The system of claim 22, wherein there are additional user data sections in the storage medium.

36. A system for storing data files;
a magnetic tape medium;
means for selecting a first set of data files to write to a first user data section of the magnetic tape medium, wherein the magnetic tape medium further includes a second user data section, and wherein the first user data section comprises a faster access user data section than the second user data section;
means for transferring the first set of data files to write to the magnetic tape medium wherein the first set of data files are written to the first user data section and for transferring the second set of user data files to write to the magnetic tape medium after writing the first set of data files, wherein the second set of data files are written to the second user data section of the magnetic tape medium.

37. The system of claim 36, wherein before writing the second set of data files to the magnetic tape medium, filling the first user data section with data.

38. The system of claim 36, wherein the first user data section has a shorter longitudinal length than the second user data section.

39. The system of claim 36, wherein data is written in separate serpentine patterns within the first and second user data sections.

40. The system of claim 36, wherein the first user data section is located closer to a beginning of the tape medium than the second user data section.

41. The system of claim 36, wherein the first set of data files comprises previews of a multimedia files and wherein the second set of data files comprises the full multimedia files for which previews are included in the first set of data files.

42. An article of manufacture including code for storing data in a storage medium by:
providing a layout of a magnetic tape storage medium including a first and second user data sections, wherein the first user data section has a shorter longitudinal length than the second user data section so that the first user data section comprises a faster access storage space than the second user data section;
determining a first set of data to be accessed with less delay than a second set of data;
writing the first set of data to the first user data section in a serpentine pattern; and
writing the second set of data to the second user data section in a serpentine pattern separate from the serpentine pattern of the first user data section.

43. The article of manufacture of claim 42, wherein data is written to the second user data section after the first user data section is filled with data.

44. The article of manufacture of claim 42, wherein the first and second user data sections are comprised of separate wrap sections on the tape.

45. The article of manufacture of claim 42, wherein the magnetic tape medium is implemented using Linear Tape Open (LTO) technology.

46. The article of manufacture of claim 42, wherein data is written in a serpentine pattern in n wrap sections between a beginning point and end point of the first user data section and in n wrap sections between a beginning point and end point of the second user data section, whereby there are a total of 2*n wrap sections in the first and second user data sections.

47. The article of manufacture of claim 46, wherein writing the data to wrap sections between the beginning and end points of the first and second user data sections further comprises:
writing in the serpentine pattern data to a first through (n−1) wrap sections between the beginning and end points in the first user data section; and
writing in the serpentine pattern data to an n through (2*n−1) wrap sections between the beginning and end points in the second user data section.

48. The article of manufacture of claim 47, further comprising:
writing data to wrap section 2*n from the end to the beginning points of the first user data section.

49. The article of manufacture of claim 46, wherein writing the data to wrap sections between the beginning and end points of the first and second user data sections further comprises:
writing in the serpentine pattern data to a first through n wrap sections between the beginning and end points in the first user data section; and
writing in the serpentine pattern data to an (n+1) through (2*n) wrap sections between the beginning and end points in the second user data section.

50. The article of manufacture of claim 42, wherein the first user data section is located closer to a beginning of the tape medium than the second user data section.

51. The article of manufacture of claim 42, wherein data in a non-volatile memory in a cartridge including the magnetic tape medium indicates beginning and end longitudinal positions on the tape medium of the first and second user data sections.

52. The article of manufacture of claim 42, wherein data within each user data section is stored in a consecutive wrap section, which comprises a section of the wrap extending the length of the tapes track groups, further comprising:
receiving a request to access a new position on the storage medium;
determining one wrap section in one of the first or second user data sections including the requested new position; and
accessing the requested new position in the determined wrap section in one of the first or second user data sections.

53. The article of manufacture of claim 42, wherein there are additional user data sections in the storage medium.

54. An article of manufacture for storing data files on a magnetic tape medium by:
selecting a first set of data files to write to a first user data section of the magnetic tape medium, wherein the magnetic tape medium further includes a second user data section, and wherein the first user data section has a shorter longitudinal length than the second user data section so that the first user data section comprises a faster access user data section than the second user data section;
transferring the first set of data files to write to the magnetic tape medium wherein the first set of data files are written to the first user data section in a serpentine pattern; and transferring the second set of user data files to write to the magnetic tape medium after writing the first set of data files, wherein the second set of data files are written to the second user data section of the magnetic tape medium in a serpentine pattern separate from the serpentine pattern of the first user data section.

55. The article of manufacture of claim 54, wherein before writing the second set of data files to the magnetic tape medium, filling the first user data section with data.

56. The article of manufacture of claim 54, wherein the first user data section is located closer to a beginning of the tape medium than the second user data section.

57. An article of manufacture for storing data files on a magnetic tape medium by:

selecting a first set of data files to write to a first user data section of the magnetic tape medium, wherein the magnetic tape medium further includes a second user data section, and wherein the first user data section comprises a faster access user data section than the second user data section;

transferring the first set of data files to write to the magnetic tape medium wherein the first set of data files are written to the first user data section; and transferring the second set of user data files to write to the magnetic tape medium after writing the first set of data files, wherein the second set of data files are written to the second user data section of the magnetic tape medium wherein the first set of data files comprises previews of a multimedia files and wherein the second set of data files comprises the full multimedia files for which previews are included in the first set of data files.

* * * * *